US008199102B2

(12) United States Patent
Lee et al.

(10) Patent No.: US 8,199,102 B2
(45) Date of Patent: Jun. 12, 2012

(54) LIQUID CRYSTAL DISPLAY AND METHOD OF DRIVING THE SAME UTILIZING DATA LINE BLOCKS

(75) Inventors: Dong Yub Lee, Siheung-Si (KR); Soong Yong Joo, Seongnam-Si (KR); Hyoung Sik Moon, Seoul (KR); Jung Sun Lee, Gwangju-Si (KR); Hyun Joo Hwang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1038 days.

(21) Appl. No.: 11/953,723

(22) Filed: Dec. 10, 2007

(65) Prior Publication Data

US 2008/0284758 A1 Nov. 20, 2008

(30) Foreign Application Priority Data

May 18, 2007 (KR) ........................ 10-2007-0048755

(51) Int. Cl.
*G09G 3/36* (2006.01)
*G02F 1/1343* (2006.01)
*G02F 1/1345* (2006.01)

(52) U.S. Cl. .......... 345/103; 345/99; 345/100; 349/143; 349/149

(58) Field of Classification Search ............ 345/87–103, 345/204, 209, 694–695; 349/77, 80, 106, 349/139, 143, 149, 152
See application file for complete search history.

(56) References Cited

U.S. PATENT DOCUMENTS

| | | | | |
|---|---|---|---|---|
| 6,456,350 | B1 * | 9/2002 | Ashizawa et al. | 349/141 |
| 6,552,706 | B1 * | 4/2003 | Ikeda et al. | 345/96 |
| 6,731,262 | B2 | 5/2004 | Hector et al. | |
| 7,505,017 | B1 * | 3/2009 | Yeo et al. | 345/88 |
| 7,728,810 | B2 * | 6/2010 | You et al. | 345/103 |
| 2003/0090614 | A1 * | 5/2003 | Kim et al. | 349/149 |
| 2004/0222961 | A1 * | 11/2004 | Lin et al. | 345/103 |
| 2005/0083341 | A1 | 4/2005 | Higgins et al. | |
| 2006/0044292 | A1 * | 3/2006 | Shen et al. | 345/204 |
| 2006/0061605 | A1 | 3/2006 | Credelle | |
| 2008/0180369 | A1 * | 7/2008 | Chiu et al. | 345/87 |

* cited by examiner

*Primary Examiner* — Bipin Shalwala
*Assistant Examiner* — Keith Crawley
(74) *Attorney, Agent, or Firm* — Innovation Counsel LLP

(57) ABSTRACT

A liquid crystal display and a method of driving the same. The liquid crystal display includes a liquid crystal display panel having a plurality of gate lines and a plurality of data lines formed on a substrate to cross each other, and a plurality of pixels respectively connected to the plurality of gate lines and the plurality of data lines; a data driving unit for outputting data signals through a plurality of channel terminals; and a line selection unit for applying the data signals to alternately arranged first data line blocks having data lines arranged adjacent to one side of corresponding pixels and second data line blocks having data lines arranged adjacent to the other side of corresponding pixels.

15 Claims, 6 Drawing Sheets

LIQUID CRYSTAL DISPLAY AND METHOD OF DRIVING THE SAME UTILIZING DATA LINE BLOCKS

REFERENCE TO RELATED APPLICATIONS

This application claims priority to Korean Patent application No. 10-2007-0048755, filed on May 18, 2007 and all the benefits accruing therefrom under 35 U.S.C. 119, the contents of which are herein incorporated by reference in their entirety.

BACKGROUND OF THE INVENTION

1. Field of the Invention

The present invention relates to a liquid crystal display and a method of driving the same, and more particularly, to a liquid crystal display having a PenTile pixel arrangement and a method of driving the same.

2. Description of the Related Art

In a PenTile pixel arrangement, blue pixels are shared to display two dots. The blue pixels that are adjacent to one another are driven by different gate driving circuits. This PenTile pixel arrangement is used to achieve high resolution with a reduced number of data driving circuits. Further, a PenTile RGBW scheme, wherein a white (W) pixel as well as red (R), green (G) and blue (B) pixels is used, has been proposed to implement a liquid crystal display capable of providing an image of higher quality at high resolution.

Since the data driving circuit for a liquid crystal display is mounted in the form of a chip on a liquid crystal display panel, it cannot readily cope with a change in the resolution of the liquid crystal display panel. To solve this problem, a line selection unit is provided between the data driving circuit and the liquid crystal display panel. The line selection unit delivers a data signal supplied from one channel of the data driving circuit to the plurality of data lines at different time intervals. When pixels on a row selected by a gate driving signal supplied from a gate driving circuit are turned on, and the data signal from the data driving circuit is sequentially supplied to a plurality of pixels through the line selection unit at the time intervals, an image is displayed.

However, if such a driving manner is applied to the liquid crystal display having the PenTile RGBW pixel arrangement, a vertical stripe defect is generated at a specific pixel array due to coupling between a data line and an adjacent pixel.

SUMMARY OF THE INVENTION

The present invention, according to one aspect thereof, provides a liquid crystal display and a method of driving the same, wherein the vertical stripe defect generated by coupling between a data line and an adjacent pixel is prevented.

According to an aspect of the present invention, a liquid crystal display, includes: a liquid crystal display panel having a plurality of gate lines and a plurality of data lines formed on a substrate to cross each other, and a plurality of pixels respectively connected to the plurality of gate lines and the plurality of data lines; a data driving unit for outputting data signals through a plurality of channel terminals; and a line selection unit for applying the data signals to alternately arranged first and second data line blocks, each of the data line blocks having a plurality of the data lines, wherein the first data line blocks include the data lines arranged adjacent to one side of the corresponding pixels and second data line blocks include the data lines arranged to the other side of the corresponding pixels. The line selection unit may include a plurality of switching units, each of the switching units applying the data signal from each channel terminal to the data line block connected to the channel terminal.

Each switching unit may sequentially apply the data signal output through each channel terminal to the plurality of data lines in the data line block.

The pixels may include red, green, blue and white pixels.

The red, green, blue and white pixels may be sequentially arranged in a gate line extending direction, and two of the red, green, blue and white pixels may be alternately arranged in a data line extending direction.

The red, green, blue and white pixels may be sequentially arranged in a gate line extending direction, and the same color pixels may not be successively arranged in the gate line extending direction and a data line extending direction.

The data signal may be sequentially applied to the plurality of data lines in the first data line block along a first direction, and the data signal may be sequentially applied to the plurality of data lines in the second data line block along a second direction opposite to the first direction.

The first direction may be a gate line extending direction. The respective data lines in the first data line blocks may be arranged adjacent to the right side of the corresponding pixels, and the respective data lines in the second data line blocks may be arranged adjacent to the left side of the corresponding pixels.

The second direction may be a gate line extending direction.

The respective data lines in the first data line blocks may be arranged adjacent to the left side of the corresponding pixels, and the respective data lines in the second data line blocks may be arranged adjacent to the right side of the corresponding pixels.

The first data line block may include an even number of data lines, and the second data line block may include an even number of data lines.

The data driving unit may output the data signal with a changed polarity.

The data driving unit may use an N×1 inversion manner in which the polarity of the data signal is inverted every N-th gate line, where N is a natural number.

The display may further include a signal control unit for outputting a selection control signal for controlling the line selection unit.

Each switching unit may include a plurality of switching devices driven by the selection control signal.

According to another aspect of the present invention, there is provided a method of driving a liquid crystal display, including: outputting data signals through a plurality of channel terminals; and applying the data signals output through the respective channel terminals to first data line blocks and second data line blocks, wherein the data signal is sequentially applied to the plurality of data lines in the first data line block along a first direction, and the data signal is sequentially applied to the plurality of data lines in the second data line block along a second direction opposite to the first direction.

The data lines in the first data line blocks may be arranged adjacent to one side of the corresponding pixels, and the data lines in the second data line blocks may be arranged adjacent to the other side of the corresponding pixels, the first and second data line blocks being alternately arranged.

Outputting data signals may include outputting the data signals with an inverted polarity every N-th gate line, where N is a natural number.

BRIEF DESCRIPTION OF THE DRAWINGS

Preferred embodiments of the present invention can be understood in more detail from the following description taken in conjunction with the accompanying drawings, in which.

DESCRIPTION

Hereinafter, preferred embodiments of the present invention will be described in detail with reference to the accompanying drawings.

Figure 1:
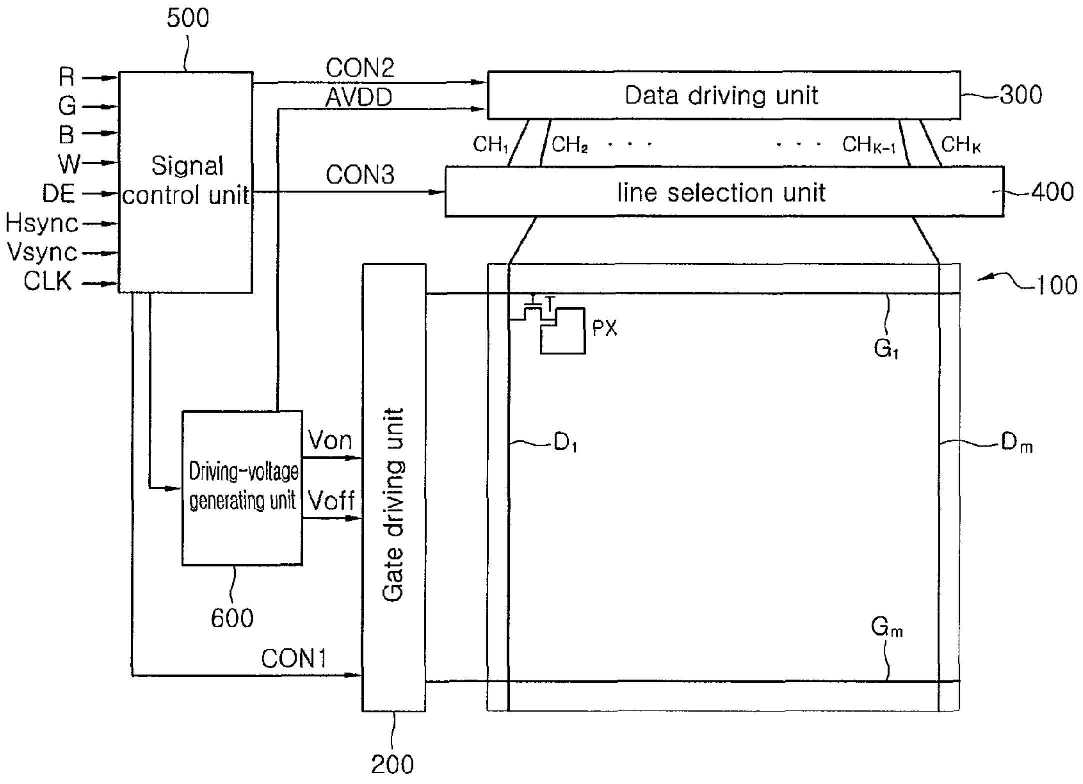
FIG. 1 is a block diagram of a liquid crystal display according to an embodiment of the present invention.
Figure 2:
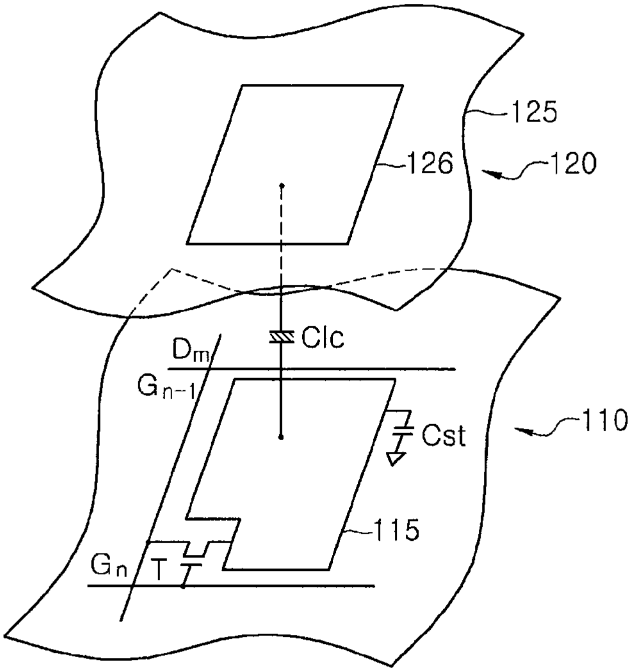
FIG. 2 is an equivalent circuit diagram of a pixel of a liquid crystal display panel.

FIG. 1 is a block diagram of a liquid crystal display according to an embodiment of the present invention, and FIG. 2 is an equivalent circuit diagram of a pixel of a liquid crystal display panel.

Referring to FIGS. 1 and 2, a liquid crystal display according to an embodiment of the present invention includes a liquid crystal display panel 100, a gate driving unit 200, a data driving unit 300, a line selection unit 400, a signal control unit 500 and a driving-voltage generating unit 600.

The liquid crystal display panel 100 includes a plurality of gate lines $G_1$ to $G_n$ extending in one direction, e.g., in a row direction, and a plurality of data lines $D_1$ to $D_m$ extending in a direction perpendicular thereto, e.g., in a column direction. The liquid crystal display panel 100 further includes pixel areas, which are provided at intersections of the gate lines $G_1$ to $G_n$ and the data lines $D_1$ to $D_m$. Each pixel area is formed with a pixel PX having a thin film transistor T, a storage capacitor Cst, and a liquid crystal capacitor Clc. The liquid crystal display panel 100 includes a thin film transistor substrate 110 having the thin film transistors T, the gate lines $G_1$ to $G_n$, the data lines $D_1$ to $D_m$ and pixel electrodes 115; a color filter substrate 120 having a black matrix, color filters 126 and a common electrode 125; and a liquid crystal 130 interposed between the thin film transistor substrate 110 and the color filter substrate 120.

Each thin film transistor T includes gate, source, and drain electrodes. The gate electrodes are connected to the gate lines $G_1$ to $G_n$, the source electrodes are connected to the data lines $D_1$ to $D_m$, and the drain electrodes are connected to the pixel electrodes 115. In response to a gate signal applied to a corresponding one of the gate lines $G_1$ to $G_n$, the thin film transistor T supplies a data signal supplied through a corresponding one of the data lines $D_1$ to $D_m$ to the pixel electrode to change an electric field between both ends of the liquid crystal capacitor Clc. This changes an arrangement of the liquid crystal 130 to adjust transmissivity of light supplied from a backlight (not shown).

The gate driving unit 200, the data driving unit 300, the line selection unit 400, the signal control unit 500 and the driving-voltage generating unit 600 provide a plurality of signals for driving the liquid crystal display panel 100. The gate driving unit 200 may be formed directly on the liquid crystal display panel 100. The data driving unit 300 may be mounted on the liquid crystal display panel 100. Alternatively, the data driving unit 300 may be mounted on an additional printed circuit board (PCB) and then electrically connected to the liquid crystal display panel 100 through a flexible printed circuit (FPC) board. The line selection unit 400 may be mounted on the liquid crystal display panel 100, and the signal control unit 500 and the driving-voltage generating unit 600 may be mounted on a printed circuit board, and then electrically connected to the liquid crystal display panel 100 through a flexible printed circuit board.

The signal control unit 500 receives image signals, i.e., pixel data R, G, B and W, and control signals, such as a horizontal synchronization signal Hsync, a vertical synchronization signal Vsync, a main clock CLK, a data enable signal DE and the like from an external graphic controller (not shown). The signal control unit 500 processes the pixel data R, G, B, and W according to an operation condition of the liquid crystal display panel 100 to generate a gate control signal CON1, a data control signal CON2, and a selection control signal CON3, and sends the signals to the gate driving unit 200, the data driving unit 300, and the line selection unit 400, respectively. Here, the gate control signal CON1 includes a vertical synchronization start signal for instructing a start of output of the gate turn-on voltage Von, a gate clock signal for controlling a timing to output the gate turn-on voltage Von, an output enable signal for controlling the duration of the gate turn-on voltage Von, and the like. Further, the data control signal CON2 includes a horizontal synchronization start signal for indicating a transmission start of the pixel data, a load signal for instructing to apply a data voltage to the corresponding data line, an inversion signal for inverting the polarity of a gradation voltage relative to a common voltage, a data clock signal, and the like. The selection control signal CON3 includes a plurality of selection control signals CON31 to CON34 (see FIG. 4) for controlling the operation of a plurality of switching devices of each switching unit in the line selection unit 400.

The driving-voltage generating unit 600 generates a variety of driving voltages required for driving the liquid crystal display device by using external power input from an external power supply. The driving-voltage generating unit 600 generates a reference voltage AVDD, the gate turn-on voltage Von, a gate turn-off voltage Voff, and the common voltage. In response to a control signal from the signal control unit 500, the driving-voltage generating unit 600 applies the gate turn-on voltage Von and the gate turn-off voltage Voff to the gate driving unit 200 and applies the reference voltage AVDD to the data driving unit 300. Here, the reference voltage AVDD is used as reference voltage for generating the gradation voltage to drive the liquid crystal.

The gate driving unit 200 applies the gate turn on/off voltage Von/Voff from the driving-voltage generating unit 600 to the gate lines $G_1$ to $G_n$ in response the gate control signal CON1 from the signal control unit 500. Accordingly, the thin film transistors T can be controlled so that the gradation voltage is applied to the pixel.

The data driving unit 300 generates the gradation voltage using the data control signal CON2 from the signal control unit 500 and the reference voltage AVDD from the driving-voltage generating unit 600, and then applies the gradation voltage to channel terminals $CH_1$ to $CH_k$.

The line selection unit 400 is mounted on the liquid crystal display panel 100 to connect the channel terminals $CH_1$ to $CH_k$ of the data driving unit 300 to the plurality of data lines $D_1$ to $D_m$. In response to the selection control signal CON3 output from the signal control unit 500, the line selection unit 400 supplies the data signal from the data driving unit 300 to the plurality of data lines through the channel terminals $CH_1$ to $CH_k$. The data signal is sequentially supplied to the plurality of data lines connected to a channel terminal.

Figure 3:
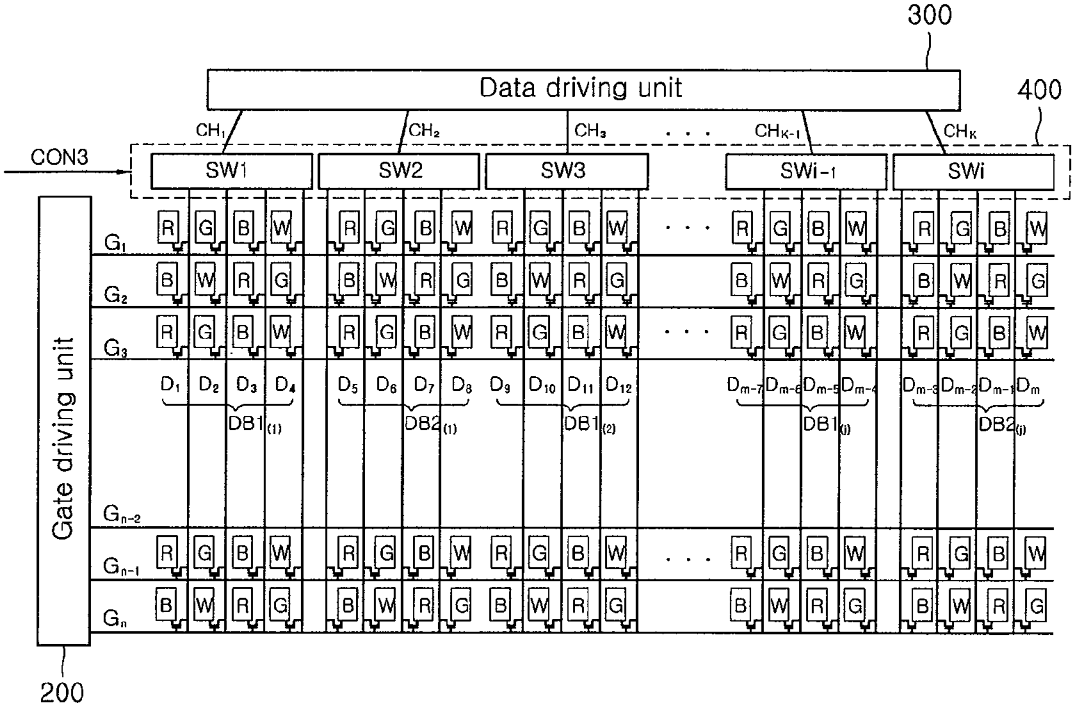
FIG. 3 is a schematic view showing a liquid crystal display panel according to the embodiment of the present invention.
Figure 4:
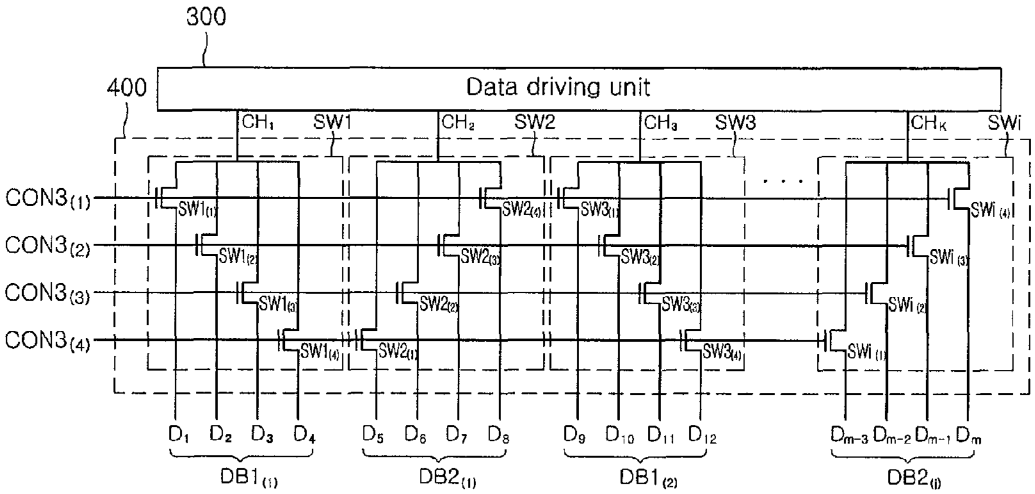
FIG. 4 is a schematic view showing a line selection unit according to the embodiment of the present invention.
Figure 5:
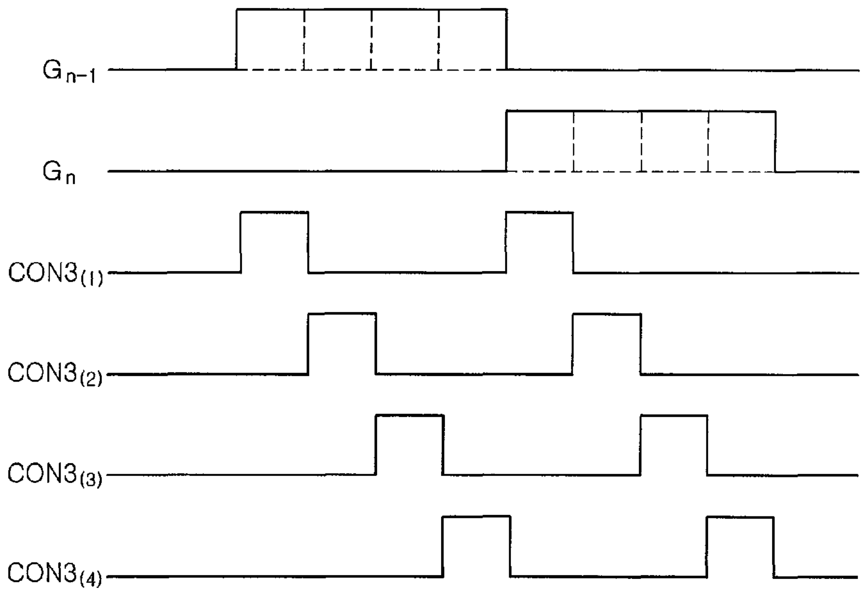
FIG. 5 is a timing diagram of selection control signals applied to the line selection unit shown in FIG. 4.
Figure 6:
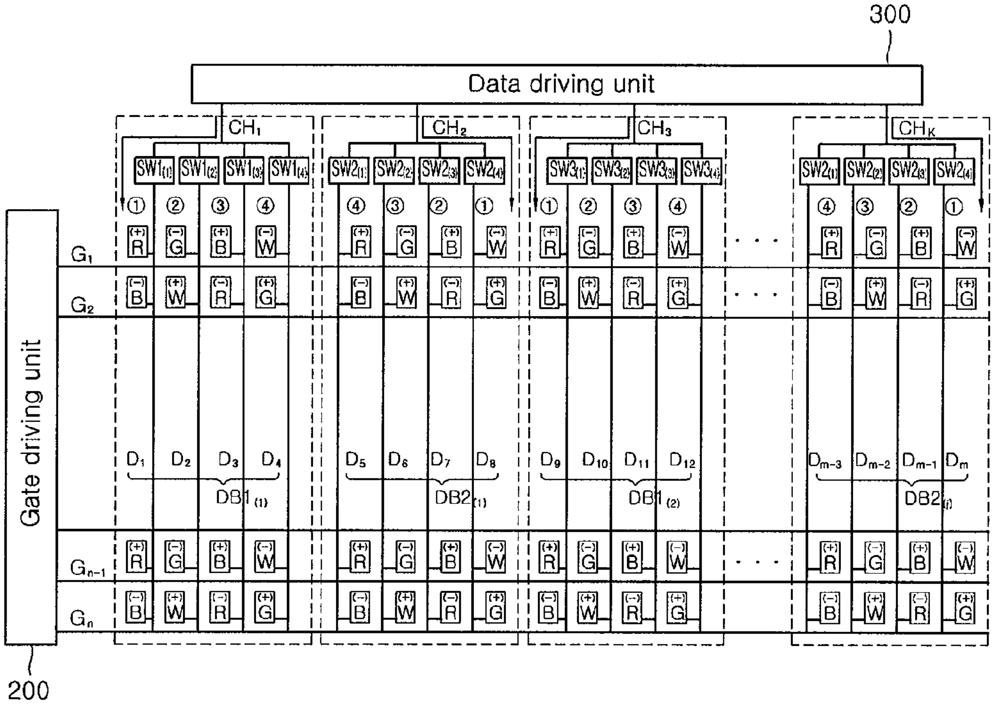
FIGS. 6 and 7 are views illustrating a method of driving the liquid crystal display according to the embodiment of the present invention.
Figure 7:
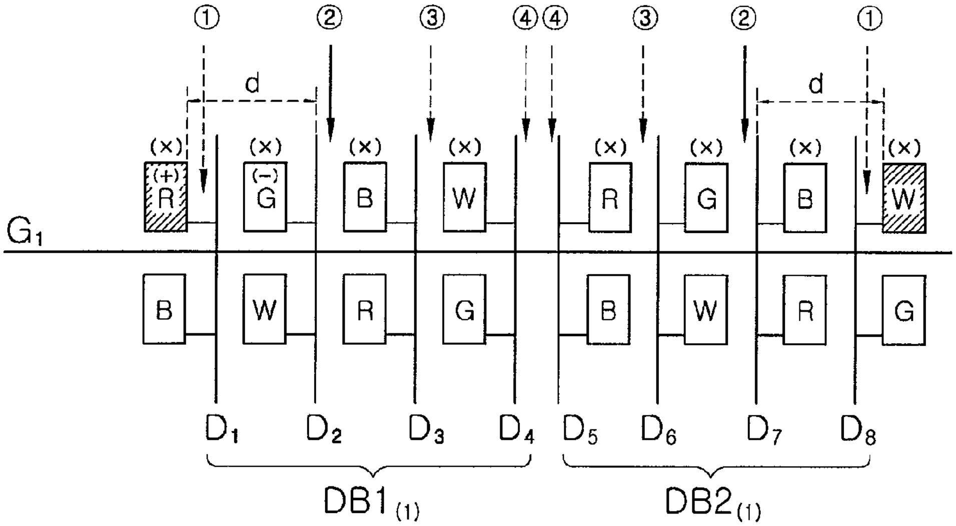

FIG. 3 is a schematic view showing a liquid crystal display panel according to the embodiment of the present invention, FIG. 4 is a schematic view showing a line selection unit according to the embodiment of the present invention, FIG. 5 is a timing diagram of selection control signals applied to the line selection unit shown in FIG. 4, and FIGS. 6 and 7 are views illustrating a method of driving the liquid crystal display according to the embodiment of the present invention.

Referring to FIGS. 3 to 6, the liquid crystal display panel 100 includes the plurality of gate lines $G_1$ to $G_n$ extending in the row direction, and the plurality of data lines $D_1$ to $D_m$ extending in the column direction crossing the gate lines. The liquid crystal display panel 100 further includes the plurality of pixels provided at intersections between the gate lines $G_1$ to $G_n$ and the data lines $D_1$ to $D_m$ and connected to the gate lines and the data lines.

The plurality of pixels include red (R), green (G), blue (B) and white (W) pixels. In this embodiment, the red (R), green (G), blue (B) and white (W) pixels are sequentially arranged on each odd-numbered row, and the blue (B), white (W), red (R) and green (G) pixels are sequentially arranged on each even-numbered row. As a result, the red (R) and blue (B) pixels are alternately arranged on the odd-numbered columns, and the green (G) and white (W) pixels are alternately arranged on the even-numbered columns. In the PenTile RGBW pixel arrangement, the red (R), green (G), blue (B) and white (W) pixels may be arranged in any of several manners other than the manner discussed in this embodiment. For example, the red (R), green (G), blue (B) and white (W) pixels may be arranged so that the same color pixels are not successively arranged in the row and column directions.

The plurality of data lines $D_1$ to $D_m$ are grouped into data line blocks $\mathbf{DB1}_{(1)}$, $\mathbf{DB2}_{(1)}$, . . . , $\mathbf{DB1}_{(j)}$ and $\mathbf{DB2}_{(j)}$, each of which includes a plurality of the data lines, e.g., four of the data lines. Each channel terminal is connected to the corresponding data line block including the four data lines through the line selection unit 400. The data line blocks include the first data line blocks $\mathbf{DB1}_{(1)}$ to $\mathbf{DB1}_{(j)}$ and the second data line blocks $\mathbf{DB2}_{(1)}$ to $\mathbf{DB2}_{(j)}$, wherein the first data line blocks $\mathbf{DB1}_{(1)}$ to $\mathbf{DB1}_{(j)}$ and the second data line blocks $\mathbf{DB2}_{(1)}$ to $\mathbf{DB2}_{(j)}$ are alternately arranged.

The data lines included in each of the first data line blocks $\mathbf{DB1}_{(1)}$ to $\mathbf{DB1}_{(j)}$ are arranged adjacent to the right side of the corresponding pixels, and the data lines included in each of the second data line blocks $\mathbf{DB2}_{(1)}$ to $\mathbf{DB2}_{(j)}$ are arranged adjacent to the left side of the corresponding pixels. That is, the data lines $D_1$ to $D_4$ included in the first data line block $\mathbf{DB1}_{(1)}$ are arranged adjacent to the right side of the corresponding pixels, and the data lines $D_5$ to $D_8$ included in the second data line block $\mathbf{DB2}_{(1)}$ are arranged at the left side of and adjacent to the corresponding pixels. As a result, the fourth data line $D_4$ and the fifth data line $D_5$ are arranged adjacent to each other and thus have no pixels arranged therebetween, and the eighth data line $D_8$ and the ninth data line $D_9$ are spaced apart from each other and thus have two pixels arranged to face each other therebetween.

Switching units SW1, SW3, . . . , SWi−1 connected to the first data line blocks $\mathbf{DB1}_{(1)}$ to $\mathbf{DB1}_{(j)}$ sequentially apply data signals output through the channel terminals $CH_1$, $CH_3$, . . . , $CH_{k-1}$ to the plurality of data lines, and switching units SW2, SW4, . . . , SWi connected to the second data line blocks $\mathbf{DB2}_{(1)}$ to $\mathbf{DB2}_{(j)}$ sequentially apply data signals output through the channel terminals $CH_2$, CH4, . . . , $CH_k$ to the plurality of data lines. At this time, the order in which the data signal is applied to the plurality of data lines in the first data line block is reverse to that in which the data signal is applied to the plurality of data lines in the second data line block. That is, the data signal is sequentially applied to the plurality of data lines in the first data line blocks in the gate line extending direction, i.e., from the left to the right, and the data signal is sequentially applied to the plurality of data lines in the second data line blocks in the opposite direction to the gate line extending direction, i.e., from the right to the left.

The configuration and operation of the line selection unit 400 will be described with reference to FIGS. 4 and 5. The line selection unit 400 includes the plurality of switching units SW1 to SWi, wherein the number of the switching units may be the same as the number of the channel terminals of the data driving unit 300. Each of the switching units SW1 to SWi includes a plurality of switching devices, e.g., four switching devices. At this time, the number of the switching devices may be the same as the number of the data lines in the corresponding data line block.

In this embodiment, each of the switching units SW1 to SWi includes four switching devices, as the switching unit SWi, for example, includes $SWi_{(1)}$ to $SWi_{(4)}$, for connecting the channel $CH_k$ and the four data lines. Here, the switching device may be a transistor, but the present invention is not limited thereto. The switching device may be any of other devices having a switching function.

The first switching devices $\mathbf{SW1}_{(1)}$ to $SWi\text{−}1_{(1)}$ in the switching units connected to the first data line blocks and the fourth switching devices $\mathbf{SW2}_{(4)}$ to $SWi_{(4)}$ in the switching units connected to the second data line blocks are driven by the first selection control signal $\mathbf{CON3}_{(1)}$. And the second switching devices $\mathbf{SW1}_{(2)}$ to $SWi\text{−}1_{(2)}$ in the switching units connected to the first data line blocks and the third switching devices $\mathbf{SW2}_{(3)}$ to $SWi_{(3)}$ in the switching units connected to the second data line blocks are driven by the second selection control signal $\mathbf{CON3}_{(2)}$. Further, the third switching devices $\mathbf{SW1}_{(3)}$ to $SWi\text{−}1_{(3)}$ in the switching units connected to the first data line blocks $\mathbf{DB1}_{(1)}$ to $\mathbf{DB1}_{(j)}$ and the second switching devices $\mathbf{SW2}_{(2)}$ to $SWi_{(2)}$ in the switching units connected to the second data line blocks $\mathbf{DB2}_{(1)}$ to $\mathbf{DB2}_{(j)}$ are driven by the third selection control signal $\mathbf{CON3}_{(3)}$. And the fourth switching devices $\mathbf{SW1}_{(4)}$ to $SWi\text{−}1_{(4)}$ in the switching units connected to the first data line blocks and the first switching devices $\mathbf{SW2}_{(1)}$ to $SWi_{(1)}$ in the switching units connected to the second data line blocks are driven by the fourth selection control signal $\mathbf{CON3}_{(4)}$.

The selection control signal CON3 is input in the form of a pulse in order of the first selection control signal $\mathbf{CON3}_{(1)}$, the second selection control signal $\mathbf{CON3}_{(2)}$, the third selection control signal $\mathbf{CON3}_{(3)}$ and the fourth selection control signal $\mathbf{CON3}_{(4)}$, as shown in FIG. 5. Accordingly, in the odd-numbered switching units SW1, SW3, . . . , SWi−1 connected to the first data line blocks $\mathbf{DB1}_{(1)}$ to $\mathbf{DB1}_{(j)}$, the first, second, third and fourth switching devices are driven in this order, and in the even-numbered switching units SW2 to SWi connected to the second data line blocks $\mathbf{DB2}_{(1)}$ to $\mathbf{DB2}_{(j)}$, the fourth, third, second and first switching devices are driven in this order.

A method of driving the liquid crystal display according to the embodiment of the present invention will be described with reference to FIGS. 5 to 7. The selection control signal CON3 includes the first to fourth selection control signals $\mathbf{CON3}_{(1)}$ to $\mathbf{CON3}_{(4)}$ for controlling the operation of the plurality of switching devices $\mathbf{SW1}_{(1)}$ to $SWi_{(4)}$ of the line selection unit 400. The first selection control signal $\mathbf{CON3}_{(1)}$, the second selection control signal $CON\mathbf{3}_{(2)}$, the third selection control signal $CON\mathbf{3}_{(3)}$ and the fourth selection control signal $CON\mathbf{3}_{(4)}$ are output in the form of a pulse in this order.

In response to the data control signal CON2, the data driving unit 300 sequentially receives image data corresponding to pixels on one row, selects a gradation voltage corresponding to each image data to convert the image data into a data signal, and supplies the data signal through the channel terminals $CH_1$ to $CH_k$. The gate driving unit 200 applies the gate on voltage Von to the gate lines $G_1$ to $G_n$ and thus turns on the thin film transistors connected to the gate lines $G_1$ to $G_n$.

The gate on voltage Von is applied to the first gate line $G_1$, so that the thin film transistors connected to the first gate line $G_1$ are turned on. When data signals are applied through the odd-numbered channel terminals $CH_1$, $CH_3$, . . . , $CH_{k-1}$, the first, second, third and fourth switching devices $SW\mathbf{1}_{(1)}$ to $SW\mathbf{1}_{(4)}$ in the switching unit SW1 connected to the first data line block $DB\mathbf{1}_{(1)}$ are driven in this order. As a result, the data signals are applied to the data lines in order of the first, second, third and fourth data lines $D_1$ to $D_4$, so that the data signals are supplied to the pixels in order of the red (R), green (G), blue (B) and white (W) pixels on the odd-numbered row of the first data line block. Further, when data signals are applied through the even-numbered channel terminals $CH_2$, CH4, . . . , $CH_k$, the fourth, third, second and first switching devices $SW\mathbf{2}_{(4)}$ to $SW\mathbf{2}_{(1)}$ in the switching unit SW2 connected to the second data line block $DB\mathbf{2}_{(1)}$ are driven in this order. As a result, the data signals are applied to the data lines in order of the eighth, seventh, sixth and fifth data lines $D_8$ to $D_5$, so that the data signals are supplied to the pixels in order of the white (W), blue (B), green (G) and red (R) pixels on the odd-numbered row of the second data line block.

The first to fourth data lines $D_1$ to $D_4$ included in the first data line block $DB\mathbf{1}_{(1)}$ are arranged adjacent to the right side of the corresponding pixels, and the fifth to eighth data lines $D_5$ to $D_8$ in the second data line block $DB\mathbf{2}_{(2)}$ are arranged adjacent to the left side of the corresponding pixels.

Accordingly, the data signal is applied through the first data line block $DB\mathbf{1}_{(1)}$ to the second data line $D_2$ after the red (R) pixel connected to the first data line $D_1$ is charged. Since the second data line $D_2$ is spaced apart from the charged red (R) pixel at least as much as the size of a unit pixel (e.g., d in FIG. 7), the charged red (R) pixel is not substantially coupled with the second data line $D_2$. Similarly, when the data signal is applied to the third data line $D_3$ and the fourth data line $D_4$, there is no substantial coupling with the previously charged pixel.

Further, the data signal is applied to the seventh data line $D_7$ after the while (W) pixel connected to the eighth data line $D_8$ is charged. Since the seventh data line $D_7$ is spaced apart from the charged white (W) pixel at least as much as the size of a unit pixel (e.g., d in FIG. 7), the charged white (W) pixel is not substantially coupled with the seventh data line $D_7$. Similarly, when the data signal is applied to the sixth data line $D_6$ and the fifth data line $D_5$, there is no substantial coupling with the previously charged pixel.

According to the liquid crystal display of the embodiment of the present invention, when the data signals are sequentially applied to the first data line block and the second data line block through the respective channel terminals, the previously charged pixel is not substantially coupled with the data signal applied to the next data line. As a result, each pixel can substantially maintain its charged voltage unchanged, so that a vertical stripe defect is prevented from being generated at specific pixels.

Although the liquid crystal display according to the embodiment of the present invention may be driven by a dot inversion manner in which data signals having an inverted polarity are applied to adjacent pixels in order to prevent deterioration of the liquid crystal, the present invention is not limited thereto. The liquid crystal display may be driven in a column inversion manner, or in an N×1 inversion manner in which a polarity is inverted every N-th gate line (where, N is a natural number). That is, the liquid crystal display may be driven in a 2×1 or 3×1 inversion manner.

Figure 8:
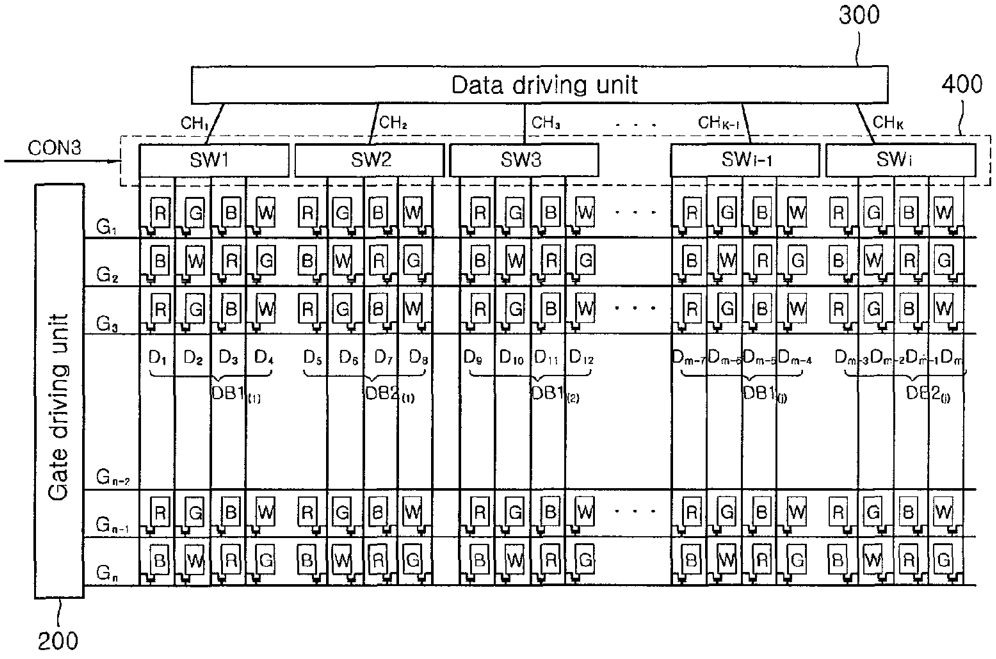
FIG. 8 is a schematic view showing a liquid crystal display panel according to another embodiment of the present invention.
Figure 9:
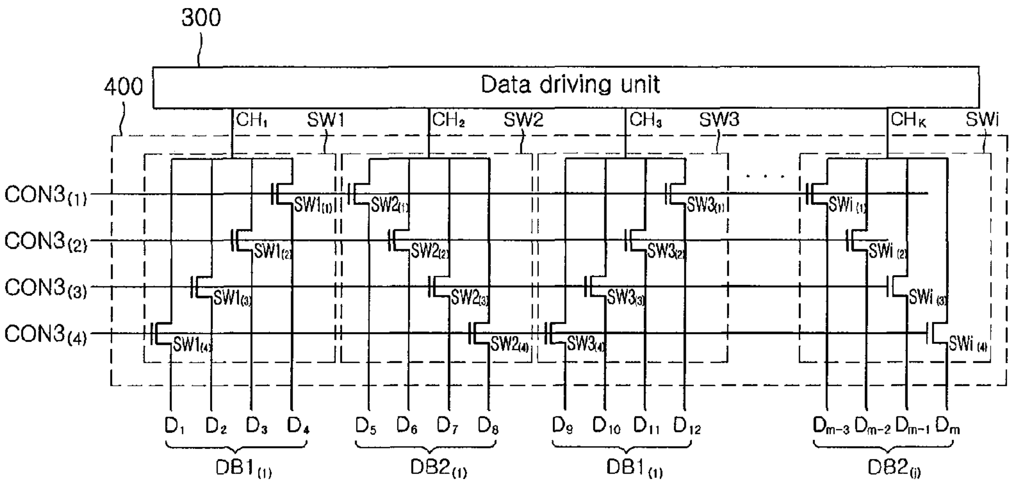
FIG. 9 is a schematic view showing a line selection unit according to the embodiment of the present invention.
Figure 10:
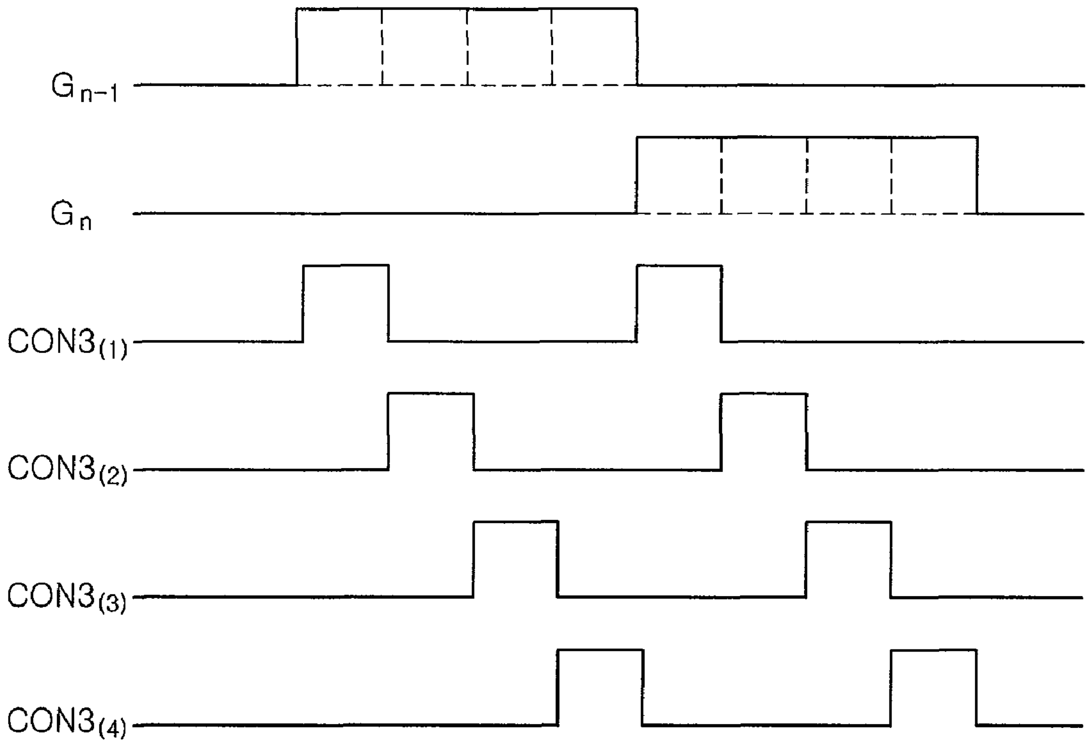
FIG. 10 is a timing diagram of selection control signals applied to the line selection unit shown in FIG. 9.

FIG. 8 is a schematic view showing a liquid crystal display panel according to another embodiment of the present invention, FIG. 9 is a schematic view showing a line selection unit according to the other embodiment of the present invention, and FIG. 10 is a timing diagram of selection control signals applied to the line selection unit shown in FIG. 9. The embodiment shown in FIGS. 8 to 10 is substantially similar to the aforementioned embodiment except a data line arrangement and a data signal applying order. Hereinafter, the following description will be focused on such differences.

Referring to FIGS. 8 to 10, the data lines included in each of the first data line blocks $DB\mathbf{1}_{(1)}$ to $DB\mathbf{1}_{(j)}$ are arranged adjacent to the left side of the corresponding pixels, and the data lines included in each of the second data line blocks $DB\mathbf{2}_{(1)}$ to $DB\mathbf{2}_{(j)}$ are arranged adjacent to the right side of the corresponding pixels. That is, the data lines $D_1$ to $D_4$ included in the first data line block $DB\mathbf{1}_{(1)}$ are arranged adjacent to the left side of the corresponding pixels, and the data lines $D_5$ to $D_8$ included in the second data line block $DB\mathbf{2}_{(1)}$ are arranged adjacent to the right side of the corresponding pixels. As a result, the eighth data line $D_8$ and the ninth data line $D_9$ are arranged adjacent to each other and have no pixels arranged therebetween, and the fourth data line $D_4$ and the fifth data line $D_5$ are spaced apart from each other and thus have two pixels arranged opposite to each other therebetween.

The switching units SW1, SW3, . . . , SWi−1 connected to the first data line blocks $DB\mathbf{1}_{(1)}$ to $DB\mathbf{1}_{(j)}$ sequentially apply data signals output through the channel terminals $CH_1$, $CH_3$, . . . , $CH_{k-1}$ to the plurality of data lines, and the switching units SW2, SW4, . . . , SWi connected to the second data line blocks $DB\mathbf{2}_{(1)}$ to $DB\mathbf{2}_{(j)}$ sequentially apply data signals output through the channel terminals $CH_2$, CH4, . . . , $CH_k$ to the plurality of data lines. At this time, the data signal is sequentially applied to the plurality of data lines in the first data line blocks in the opposite direction to the gate line extending direction, i.e., from the right to the left, and the data signal is sequentially applied to the plurality of data lines in the second data line blocks in the gate line extending direction, i.e., from the left to the right.

In addition, the first switching devices $SW\mathbf{1}_{(1)}$ to $SWi_{(1)}$ in the switching units of the line selection unit 400 are driven by the first selection control signal $CON\mathbf{3}_{(1)}$, the second switching devices $SW\mathbf{1}_{(2)}$ to $SWi_{(2)}$ are driven by the second selection control signal $CON\mathbf{3}_{(2)}$, the third switching devices $SW\mathbf{1}_{(3)}$ to $SWi_{(3)}$ are driven by the third selection control signal $CON\mathbf{3}_{(3)}$, and the fourth switching devices $SW\mathbf{1}_{(4)}$ to $Swi_{(4)}$ are driven by the fourth selection control signal $CON\mathbf{3}_{(4)}$. The selection control signal CON3, the first selection control signal $CON\mathbf{3}_{(1)}$, the second selection control signal $CON\mathbf{3}_{(2)}$, the third selection control signal $CON\mathbf{3}_{(3)}$ and the fourth selection control signal $CON\mathbf{3}_{(4)}$ are input into the line selection unit in the form of a pulse as shown in FIG. 10. Accordingly, in a case of the odd-numbered switching units SW1, SW3, . . . , SWi−1 connected to the first data line blocks $DB\mathbf{1}_{(1)}$ to $DB\mathbf{1}_{(j)}$, the first, second, third and fourth switching devices are driven in this order, so that the data signals are applied to the data lines in order of the fourth, third, second and first data lines $D_4$ to $D_1$. As a result, the data signals are supplied to the pixels in order of the white (W), blue (B), green (G) and red (R) pixels on the odd-numbered row of the first data line blocks.

The even-numbered switching units SW2, SW4, . . . , SWi connected to the second data line blocks DB2$_{(1)}$ to DB2$_{(j)}$, the first, second, third and fourth switching devices are driven in this order, so that the data signals are applied to the data lines in order of the fifth, sixth, seventh and eighth data lines $D_5$ to $D_8$. As a result, the data signals are supplied to the pixels in order of the red (R), green (G), blue (B) and white (W) pixels on the odd-numbered row of the second data line blocks.

As described above, according to the embodiments of the present invention, when the data signals are applied to the first and second data line blocks through the respective channel terminals, the previously charged pixel is not substantially coupled with the data signal applied to the next data line. As a result, the charged voltage can be kept unchanged and a vertical stripe defect can be prevented from being generated at specific pixels. In addition, the display quality of the liquid crystal display can be improved by a simple modification of the structure. The above descriptions are merely exemplary embodiments of a liquid crystal display and a method of driving the same according to the present invention, so that the present invention is not limited thereto. The true scope of the present invention should be defined to the extent that those skilled in the art can make various modifications and changes thereto without departing from the scope of the invention, as defined by the appended claims.

What is claimed is:

1. A liquid crystal display, comprising:

a liquid crystal display panel having a plurality of gate lines and a plurality of data lines formed on a substrate and crossing each other, the data lines being subdivided into respective blocks of data lines with each data lines block having a respective plural number of the data lines;

a plurality of pixels respectively connected to the plurality of gate lines and to the plurality of data lines, the pixels being arranged as a matrix having rows and columns where each row of pixels has a respective gate line operatively coupled to it and where a plural number of adjacent ones of the columns of pixels operatively couples to respective ones of a same plural number of the data lines forming a respective one of said blocks of data lines;

a data driving unit configured for outputting data signals through a plurality of channel terminals;

a line selection unit coupled to channel terminals of the data driving unit and configured for selectively applying respective ones of the data signals received from the channel terminals to respective ones of sequentially arranged data lines within the data lines blocks, and a signal control unit configured to sequentially output a plurality of selection control signals for controlling the selective data signal applying operations of the line selection unit;

wherein the sequentially output selection control signals cause a sequential selection of data lines in opposing sequencing directions for adjacent pairings of the data lines blocks;

wherein a first of the data lines blocks has its respective data lines connected to one side of the corresponding pixels of that first data lines block and an adjacent second of the data lines blocks has its respective data lines connected to an opposed other side of the corresponding pixels of that second data lines block.

2. The display as claimed in claim 1, wherein the line selection unit comprises a plurality of switching units, each of the switching units applying the data signal from each channel terminal to the data line block connected to the channel terminal.

3. The display as claimed in claim 1, wherein the pixels comprise red, green, blue and white pixels.

4. The display as claimed in claim 3, wherein the red, green, blue and white pixels are sequentially arranged in a gate line extending direction, and two of the red, green, blue and white pixels are alternately arranged in a data line extending direction.

5. The display as claimed in claim 3, wherein the red, green, blue and white pixels are sequentially arranged in a gate line extending direction, and the same color pixels are not successively arranged in the gate line extending direction and a data line extending direction.

6. The display as claimed in claim 1, wherein the first direction is a gate line extending direction.

7. The display as claimed in claim 6, wherein the respective data lines in the first data line blocks are connected to the right side of the corresponding pixels, and the respective data lines in the second data line blocks are connected to the left side of the corresponding pixels.

8. The display as claimed in claim 1, wherein the second direction is a gate line extending direction.

9. The display as claimed in claim 8, wherein the respective data lines in the first data line blocks are connected to the left side of the corresponding pixels, and the respective data lines in the second data line blocks are connected to the right side of the corresponding pixels.

10. The display as claimed in claim 1, wherein the first data line block comprises an even number of data lines, and the second data line block comprises an even number of data lines.

11. The display as claimed in claim 1, wherein the data driving unit outputs the data signal with a changed polarity.

12. The display as claimed in claim 11, wherein the data driving unit uses an N.times.1 inversion manner in which the polarity of the data signal is inverted every N-the gate line, where N is a natural number.

13. The display as claimed in claim 1, wherein each switching unit comprises a plurality of switching devices driven by the selection control signal.

14. A method of driving a liquid crystal display, where the display has a plurality of gate lines and a plurality of data lines crossing each other, the data lines being subdivided into respective blocks of data lines with each data lines block having a respective plural number of the data lines and where the display has a plurality of pixels respectively connected to the plurality of gate lines and to the plurality of data lines, the pixels being arranged as a matrix having rows and columns where each row of pixels has a respective gate line operatively coupled to it and where a plural number of adjacent ones of the columns of pixels operatively couples to respective ones of a same plural number of the data lines forming a respective one of said blocks of data lines, the method comprising:

outputting data signals through a plurality of channel terminals; and applying the data signals output through the respective channel terminals to a first subset of the data lines blocks and to a second subset of the second data lines blocks; and sequentially outputting selection control signals to a line selection unit wherein the sequentially output selection control signals cause a sequential selection of data lines in opposing sequencing directions for adjacent pairings of the data lines blocks;

wherein the data lines in the first data line blocks are connected to one side of the corresponding pixels, and the data lines in the second data line blocks are connected to the other side of the corresponding pixels, the first and the second data line blocks being alternately arranged.

15. The method as claimed in claim 14, wherein outputting data signals comprises outputting the data signal with an inverted polarity every N-th gate line, where N is a natural number.

* * * * *